(12) United States Patent
Krey et al.

(10) Patent No.: US 12,377,960 B2
(45) Date of Patent: Aug. 5, 2025

(54) WING ASSEMBLY COMPRISING A CONNECTING ASSEMBLY WITH A FIRST AND A SECOND CONNECTING ELEMENT, WING, AND AIRCRAFT

(71) Applicant: Airbus Operations GmbH, Hamburg (DE)

(72) Inventors: Dennis Krey, Hamburg (DE); Bernhard Schlipf, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/359,376

(22) Filed: Jul. 26, 2023

(65) Prior Publication Data
US 2024/0034457 A1    Feb. 1, 2024

(30) Foreign Application Priority Data
Jul. 29, 2022   (EP) .................................... 22187866

(51) Int. Cl.
*B64C 9/18* (2006.01)
*B64C 3/28* (2006.01)
*B64C 13/50* (2006.01)

(52) U.S. Cl.
CPC .............. *B64C 9/18* (2013.01); *B64C 13/50* (2013.01)

(58) Field of Classification Search
CPC .... B64C 9/06; B64C 9/18; B64C 9/20; B64C 13/50
See application file for complete search history.

(56) References Cited

U.S. PATENT DOCUMENTS

| 4,381,093 | A  | * | 4/1983  | Rudolph ................. B64C 9/16 244/219 |
| 4,669,687 | A  | * | 6/1987  | Rudolph ................. B64C 9/18 244/215 |
| 7,293,744 | B2 | * | 11/2007 | Perez-Sanchez ......... B64C 9/22 244/211 |
| 7,510,151 | B2 | * | 3/2009  | Perez-Sanchez ......... B64C 9/18 244/216 |

(Continued)

FOREIGN PATENT DOCUMENTS

| CN | 110294102 | 10/2019 |
| DE | 10133920  | 5/2004  |
| GB | 2079688   | 1/1982  |

OTHER PUBLICATIONS

Extended European Search Report for EP22187866.3 mailed Jan. 3, 2023, 7 pages.

*Primary Examiner* — Brian M O'Hara
(74) *Attorney, Agent, or Firm* — Nixon & Vanderhye P.C.

(57) ABSTRACT

A wing assembly is disclosed having a fixed wing portion, a high-lift device, and a connecting assembly movably connecting the high-lift device to the fixed wing portion, such that the high-lift device is movable between a retracted position and at least one extended position. The connecting assembly includes a first connecting element, which extends from a first end portion, at which the first connecting element is rotatably connected to the fixed wing portion, to a second end portion, and a second connecting element, which extends from a first end portion, at which the second connecting element is rotatably connected to the second end portion of the first connecting element, to a second end portion.

9 Claims, 7 Drawing Sheets

(56) References Cited

U.S. PATENT DOCUMENTS

| | | | | |
|---|---|---|---|---|
| 7,861,978 B2 * | 1/2011 | Holert | ............... | B64C 9/16 |
| | | | | 244/215 |
| 9,731,812 B2 * | 8/2017 | Walker | ............... | B64C 9/02 |
| 2006/0226297 A1 | 10/2006 | Perez-Sanchez | | |

* cited by examiner

WING ASSEMBLY COMPRISING A CONNECTING ASSEMBLY WITH A FIRST AND A SECOND CONNECTING ELEMENT, WING, AND AIRCRAFT

CROSS REFERENCE TO RELATED APPLICATION

This application claims priority to and incorporates by reference the entirety of European Patent Application EP 22187866.3, filed Jul. 29, 2022.

TECHNICAL FIELD

The invention relates to a wing assembly, a wing, and an aircraft.

BACKGROUND

Wing assemblies comprising a fixed wing portion, a high-lift device, and a connecting assembly are known. The connecting assembly movably connects the high-lift device to the fixed wing portion, such that the high-lift device is movable between a retracted position and at least one extended position. Known high-lift devices include for example flaps and slats.

It is generally desirable to provide a mechanically robust and light-weight wing assembly with which the length of the path the high-lift device can move between the retracted position and the at least one extended position can be increased.

SUMMARY

The present invention contemplates providing a mechanically robust and light-weight wing assembly with which the length of the path the high-lift device can move between the retracted position and the at least one extended position can be increased.

According to an exemplary embodiment, the wing assembly comprises a fixed wing portion, a high-lift device, and a connecting assembly movably connecting the high-lift device to the fixed wing portion, such that the high-lift device is movable between a retracted position and at least one extended position. The connecting assembly comprises a first connecting element, which extends from a first end portion, at which the first connecting element is rotatably connected to the fixed wing portion, to a second end portion, and a second connecting element, which extends from a first end portion, at which the second connecting element is rotatably connected to the second end portion of the first connecting element, to a second end portion. The second connecting element comprises an intermediate portion, which is arranged between the first end portion and the second end portion. The first portion of the high-lift device is connected to the intermediate portion of the second connecting element and a second portion of the high-lift device is connected to the second end portion of the second connecting element.

Figure 1:
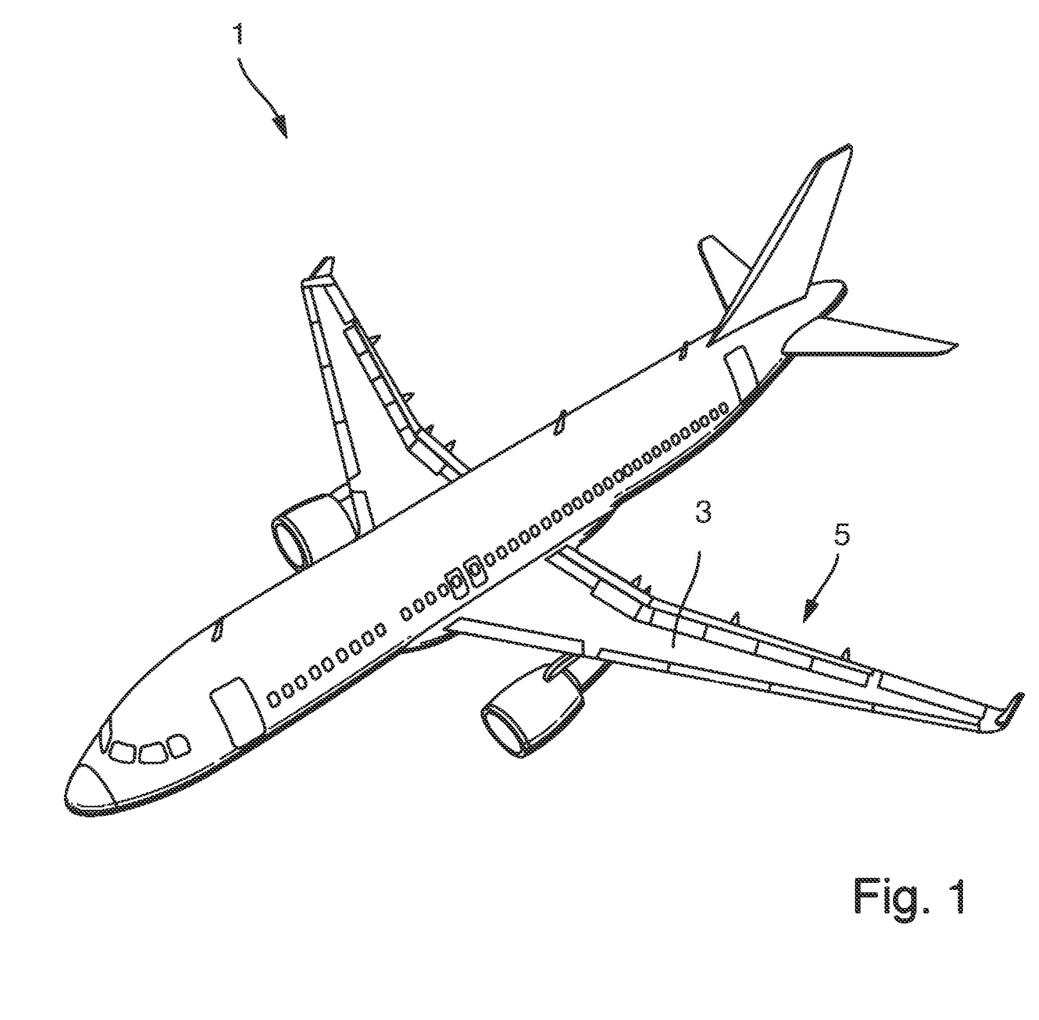
FIG. 1 is a perspective view an aircraft comprising a wing.

A main difference between the wing assembly disclosed in DE 101 33 920 B4 and the wing assembly of the present invention is the configuration of the first connecting element, the second connecting element and the high-lift device and how these components are connected to each other and to the fixed wing portion. The first end portion of the first connecting element is rotatably connected to the fixed wing portion, the first end portion of the second connecting element is rotatably connected to the second end portion of the first connecting element, the first portion of the high-lift device is connected to the intermediate portion of the second connecting element and the second portion of the high-lift device is connected to the second end portion of the second connecting element. Due to this configuration, the wing assembly of the present invention does not need to comprise a guiding lever 40 as shown in FIG. 1 of DE 101 33 920 B4 and the trajectory of the high-lift device of the present invention can still be well defined. In case the wing assembly does not comprise the guiding lever 40, the length of the path the high-lift device can move between the retracted position and the at least one extended position can be increased. For example, due to this configuration, the maximum high-lift device-angle or flap-angle can be increased from about 30 to 37° to about 40 to/or 45°. This is particularly the case, since the configuration of the present invention does not comprise the guiding lever 40 of DE 101 33 920 B4, and, therefore, the high-lift device of the present invention never assumes a metastable position in which the high-lift device does not move back from an extended position to the retracted position. Another example is that due to this configuration, the high-lift device can be positioned further into a component of the wing to minimize drag, such as in the retracted position of the high-lift device.

Since the first portion of the high-lift device is connected to the intermediate portion of the second connecting element and a second portion of the high-lift device is connected to the second end portion of the second connecting element, loads can be transferred distributed over two separate portions between the high-lift device and the second connecting element, which may reduce the bending loads acting on the individual components and may result in a weight reduction of the wing assembly. The high-lift device may be non-rotatably connected to the second connecting element. In case the high-lift device is non-rotatably connected to the second connecting element, the wing assembly provides a mechanically robust assembly for movably connecting the high-lift device to the fixed wing portion, such that the high-lift device is movable between a retracted position and at least one extended position. Further, the subassembly provides mechanical support for the movement of the high-lift device and ensures that the trajectory of the high-lift device is well defined. The first connecting element may be a lever and may be adapted to withstand compressive and tensile loads as well as bending loads. The second connecting element may be adapted to withstand compressive and tensile loads as well as bending loads. The high-lift device is movable between a retracted position and at least one extended position, i.e., the high-lift device is movable from the retracted position to the at least one extended position and from the at least one extended position to the retracted position.

In summary, a mechanically robust and light-weight wing assembly is provided with which the length of the path the high-lift device can move between the retracted position and the at least one extended position can be increased.

According to an exemplary embodiment, the wing assembly comprises a subassembly, which is attached to the fixed wing portion and to the second connecting element and which guides the second connecting element such that for each position of the first connecting element a position of the second connecting element is predefined. As will be described further below, the wing assembly may comprise a subassembly with a design of multiple different designs.

According to an exemplary embodiment, the subassembly comprises a first subassembly element, which extends from a first end portion, at which the first subassembly element is rotatably connected to the fixed wing portion, to a second end portion, a second subassembly element, which extends from a first end portion, at which the second subassembly element is rotatably connected to the second end portion of the first subassembly element, to a second end portion, at which the second subassembly element is rotatably connected to a portion of the second connecting element, and a third subassembly element, which extends from a first end portion, at which the third subassembly element is rotatably connected to the fixed wing portion, to a second end portion, at which the third subassembly element is rotatably connected to an intermediate portion of the second subassembly element, wherein the intermediate portion of the second subassembly element is arranged between the first and second end portions of the second subassembly element. This configuration is an example of a subassembly of the wing assembly.

According to an exemplary embodiment, the subassembly comprises a second subassembly element, which extends from a first end portion, at which the second subassembly element is slidably connected to the fixed wing portion, to a second end portion, at which the second subassembly element is rotatably connected to a portion of the second connecting element, and a third subassembly element, which extends from a first end portion, at which the third subassembly element is rotatably connected to the fixed wing portion, to a second end portion, at which the third subassembly element is rotatably connected to an intermediate portion of the second subassembly element, wherein the intermediate portion of the second subassembly element is arranged between the first and second end portions of the second subassembly element. This configuration is another example of a subassembly of the wing assembly.

According to an exemplary embodiment, the wing assembly comprises a drive unit, which is configured to drive rotation of the first connecting element relative to the fixed wing portion. When rotation of the first connecting element relative to the fixed wing portion is driven by the drive unit, movement of the high-lift device between the retracted position and the at least one extended position can be driven by the drive unit via the first connecting element and the second connecting element.

According to an exemplary embodiment, the drive unit comprises a rotary drive unit. This configuration is an example of a drive unit.

According to an exemplary embodiment, the drive unit comprises a linear drive unit. This configuration is another example of a drive unit.

According to an exemplary embodiment, the high-lift device is a slat. In case the high-lift device is a slat, the slat can be positioned further into a component of the wing to minimize drag, such as in the retracted position of the slat.

According to an exemplary embodiment, the high-lift device is a flap. In case the high-lift device is a flap, the maximum flap-angle can be increased, e.g., from about 30 to 37° to about 40 to/or 45°.

According to an exemplary embodiment, the high-lift device is a spoiler. In case the high-lift device is a spoiler, the spoiler can be positioned further into a component of the wing to minimize drag, such as in the retracted position of the spoiler.

According to an exemplary embodiment, the high-lift device is a flaperon. In case the high-lift device is a flaperon, the flaperon can be positioned further into a component of the wing to minimize drag, such as in the retracted position of the flaperon.

According to an exemplary embodiment, the high-lift device is an aileron. In case the high-lift device is an aileron, the aileron can be positioned further into a component of the wing to minimize drag, such as in the retracted position of the aileron.

According to an exemplary embodiment, a wing is provided comprising the features of claim 9. The wing comprises a wing assembly according to the first aspect of the invention. The features, technical effects and/or advantages described in connection with the first aspect of the invention also apply to the second aspect of the invention at least in an analogous manner, so that no corresponding repetition is made here.

According to an exemplary embodiment, an aircraft is provided comprising a wing according to the second aspect of the invention. The features, technical effects and/or advantages described in connection with the first aspect of the invention and the second aspect of the invention also apply to the third aspect of the invention at least in an analogous manner, so that no corresponding repetition is made here.

Further features, advantages and application possibilities of the present invention may be derived from the following description of exemplary embodiments and/or the figures. Thereby, all described and/or visually depicted features for themselves and/or in any combination may form an advantageous subject matter and/or features of the present invention independent of their combination in the individual claims or their dependencies. Furthermore, in the figures, same reference signs may indicate same or similar objects.

BRIEF DESCRIPTION OF THE DRAWINGS

Hereinafter, an exemplary embodiment of the present invention is described in more detail by means of a drawing.

DETAILED DESCRIPTION

Some embodiments will now be described with reference to the Figures.

Figure 2:
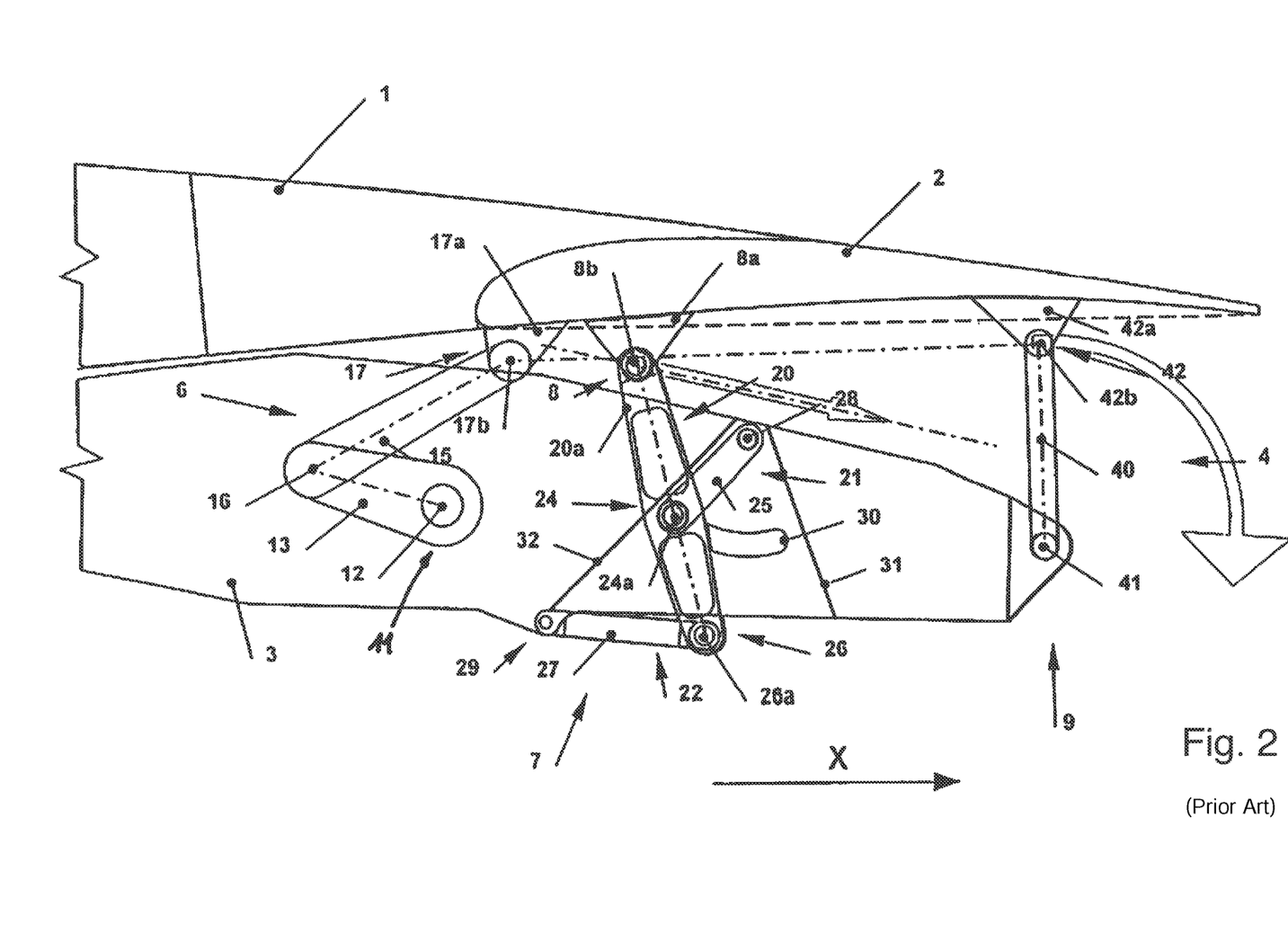
FIG. 2 is a side view of a wing assembly known from the prior art.
Figure 3:
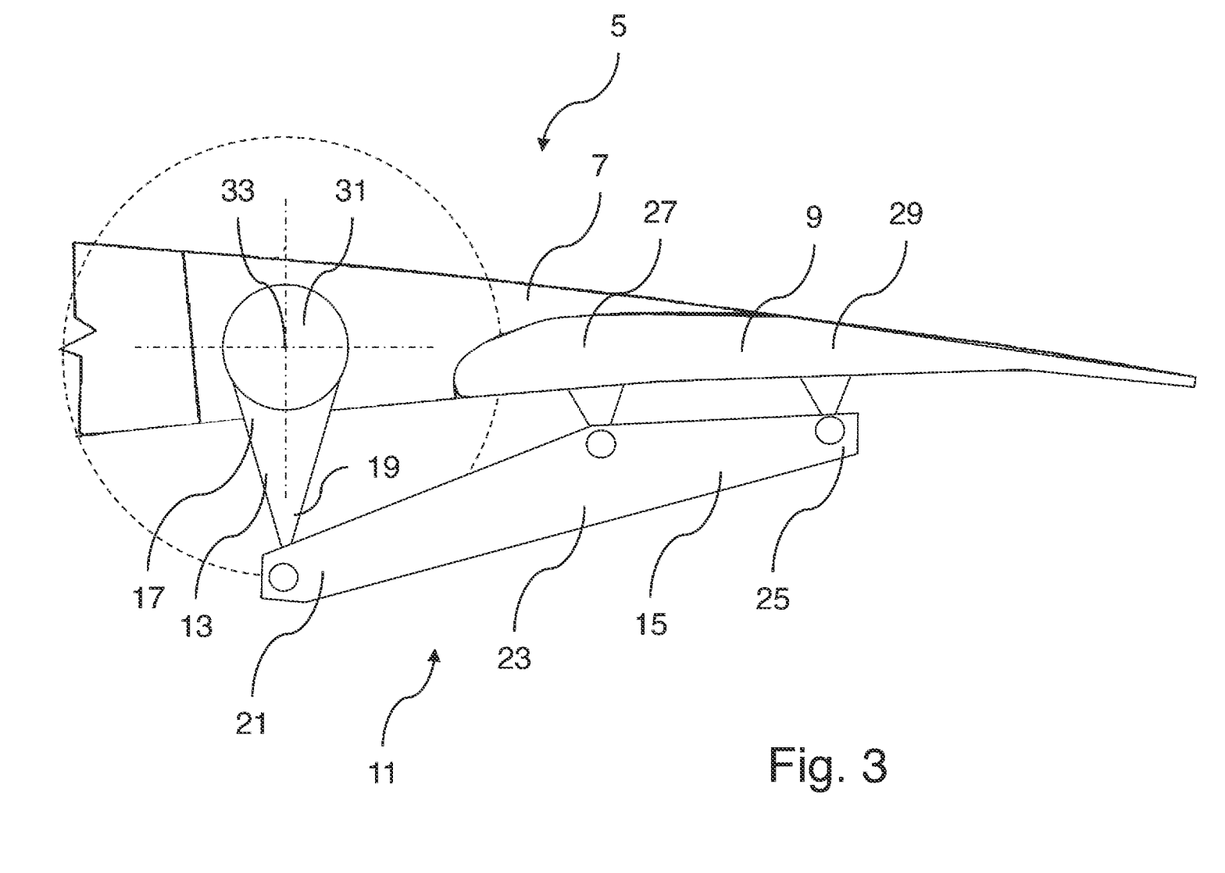
FIGS. 3 and 4 are side views of a wing assembly according to an exemplary embodiment.
Figure 4:
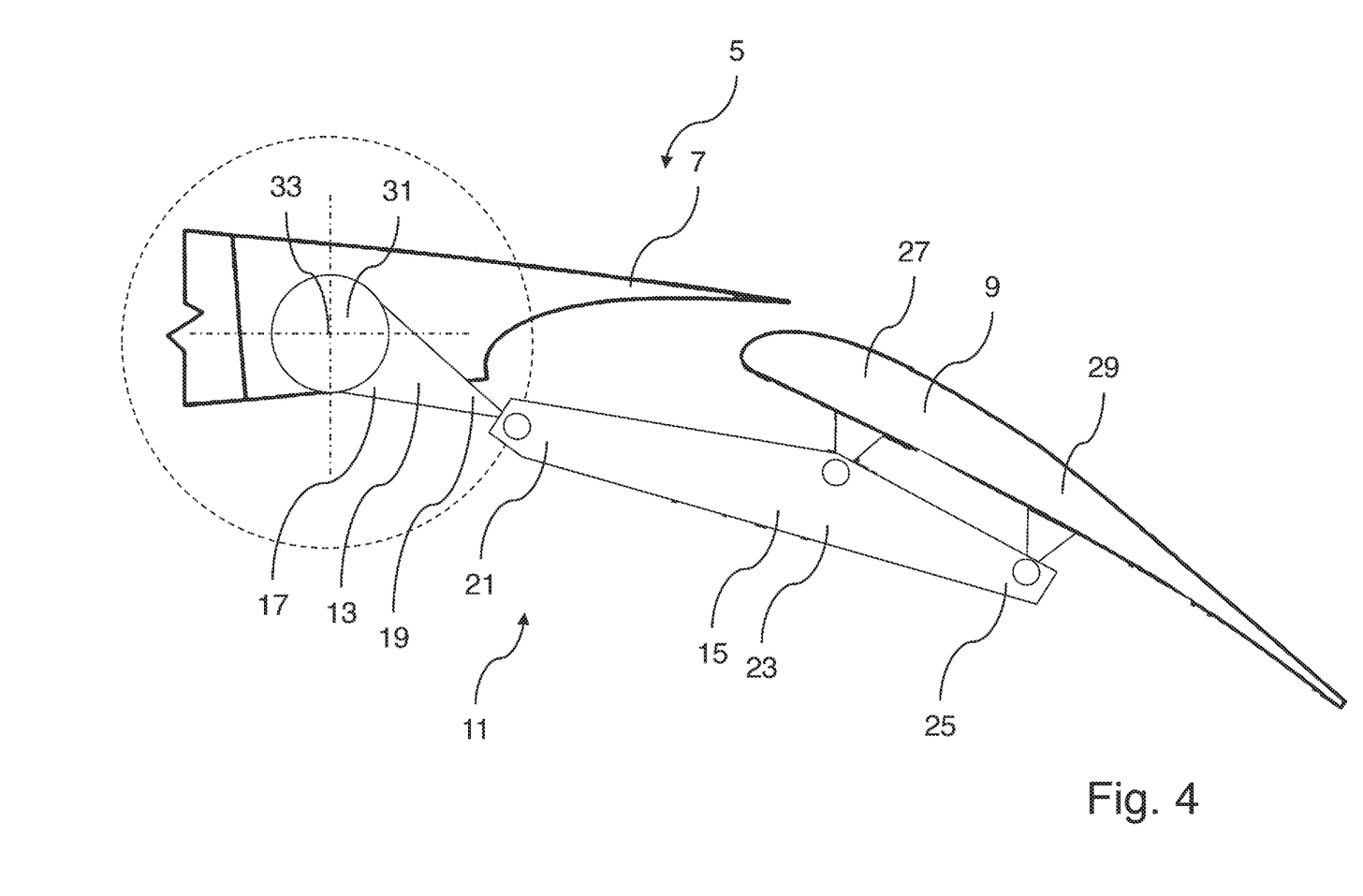
Figure 5:
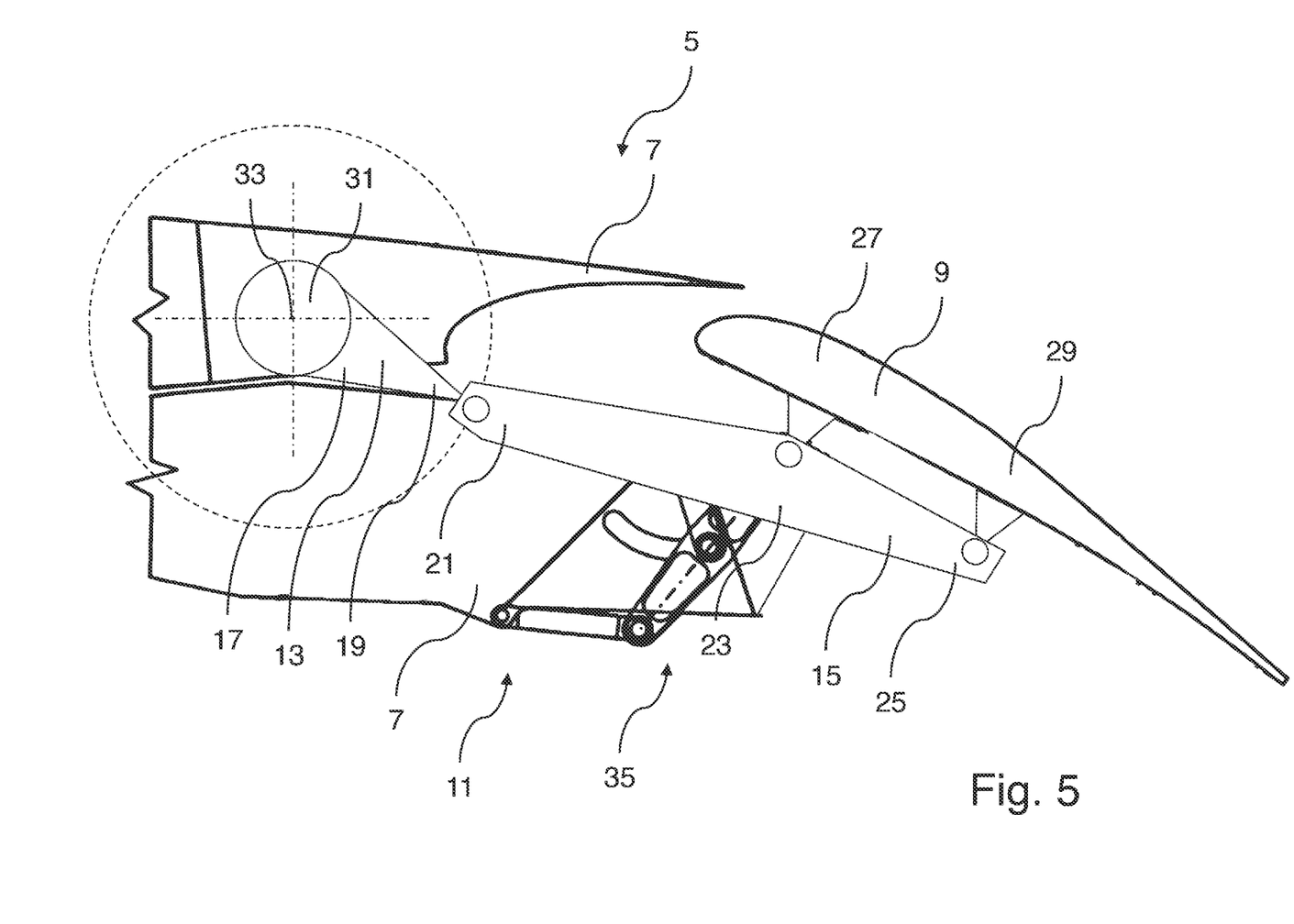
FIGS. 5 and 6 are side views of a wing assembly according to an exemplary embodiment.
Figure 6:
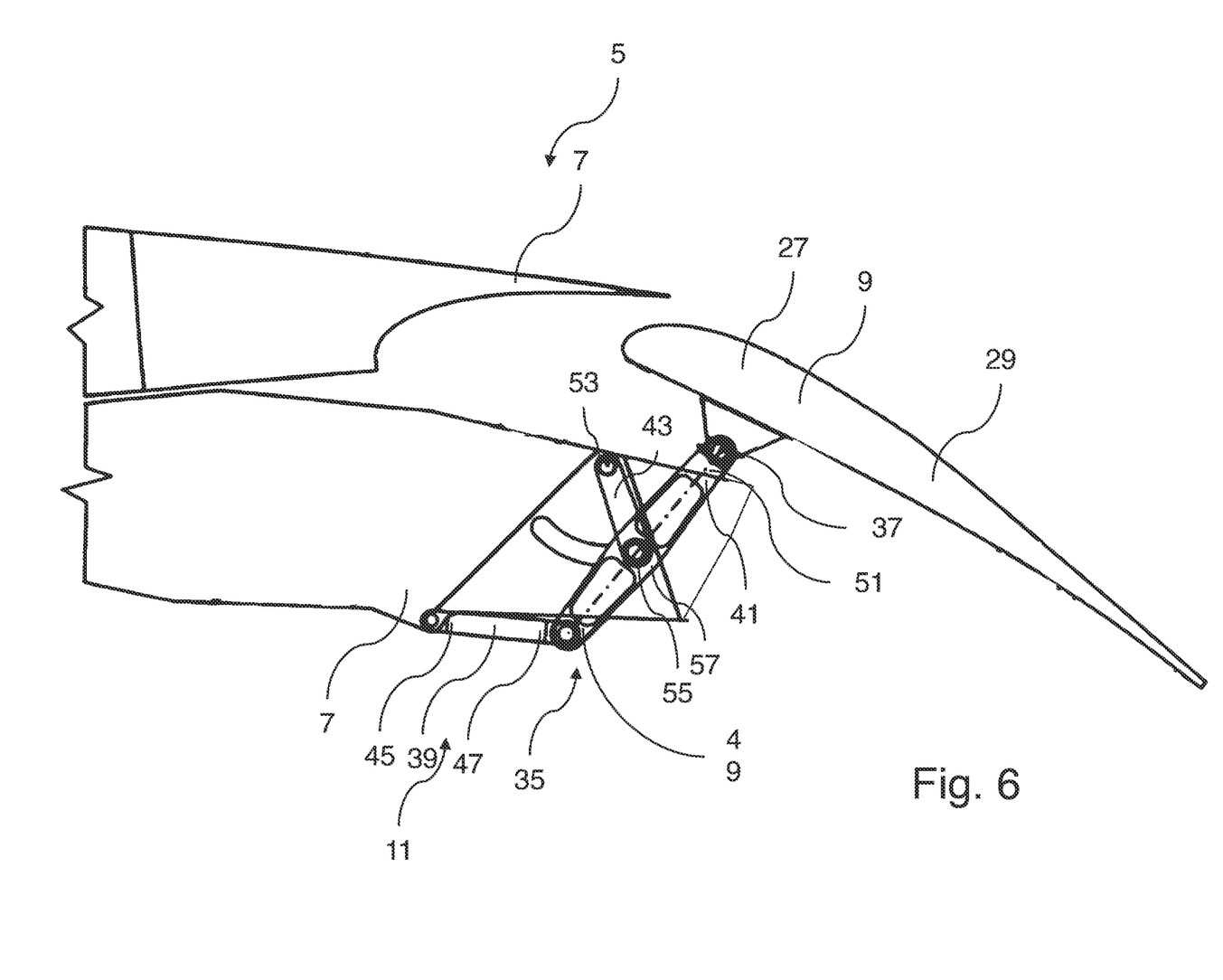
Figure 7:
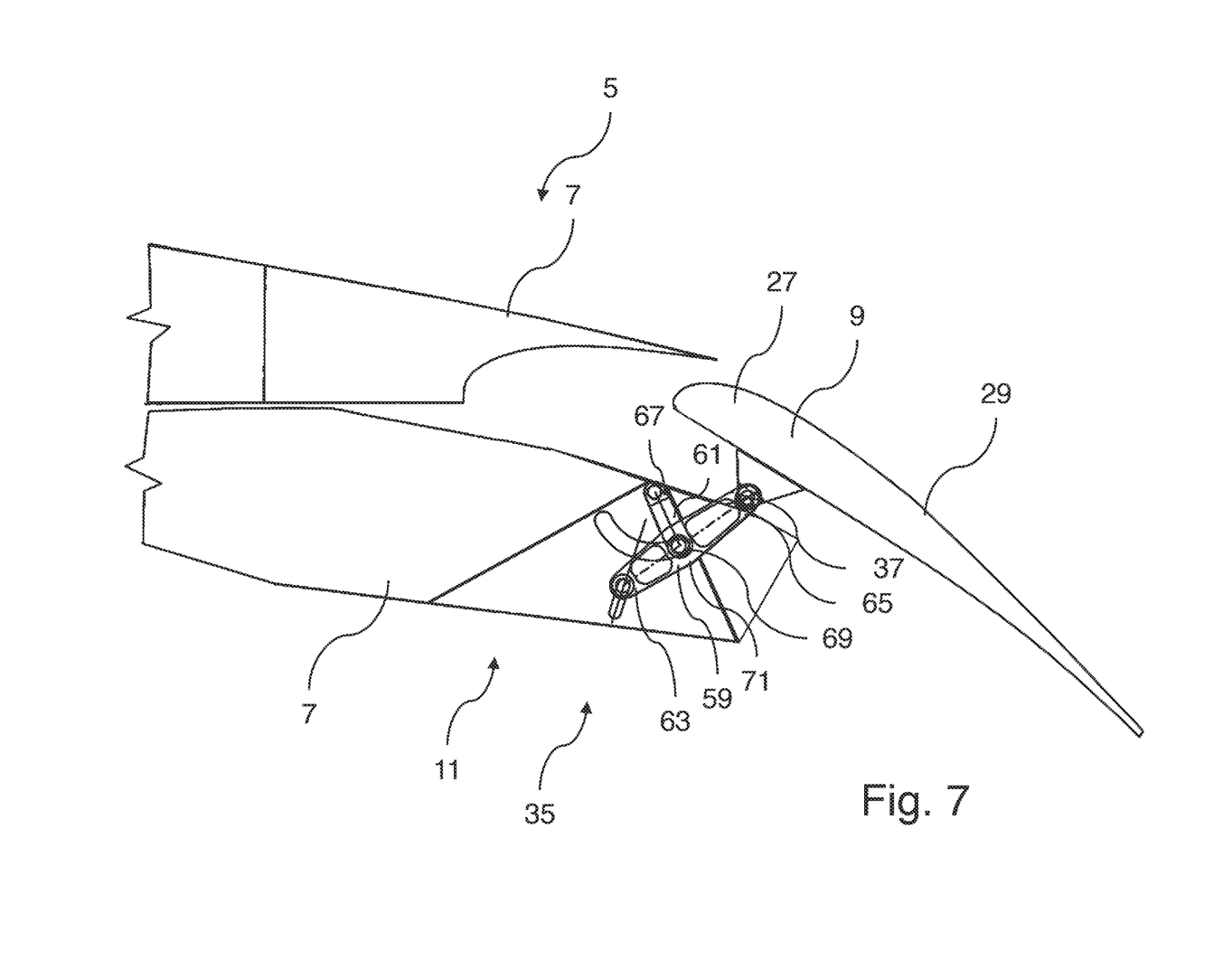
FIG. 7 is a side view of a wing assembly according to an exemplary embodiment.

FIG. 1 schematically illustrates an embodiment of an aircraft 1 comprising a wing 3. The wing 3 comprises a wing assembly 5. FIG. 2 schematically illustrates a wing assembly known from the prior art (FIG. 1 of DE 101 33 920 B4). The wing assembly shown in FIG. 2 will be referred to when the advantages of the invention will be discussed. FIGS. 3 and 4 schematically illustrate a first embodiment of a wing assembly 5 according to the invention. FIGS. 5 and 6 schematically illustrate a second embodiment of the wing assembly 5. FIG. 7 schematically illustrates a third embodiment of the wing assembly 5.

Referring to FIGS. 3, 4, 5, 6, and 7, the wing assembly 5 comprises a fixed wing portion 7, a high-lift device 9, and a connecting assembly 11. The high-lift device 9 is a flap. However, in other embodiments of the invention, the high-lift device 9 may be a slat and the features, technical effects and/or advantages that will be described in connection with the high-lift device 9 apply to both, a flap as well as to a slat, at least in an analogous manner, so that no corresponding repetition is made. In other embodiments of the invention, the high-lift device 9 may be a spoiler and the features, technical effects and/or advantages that will be described in connection with the high-lift device 9 also apply to a spoiler at least in an analogous manner, so that no corresponding repetition is made. In other embodiments of the invention, the high-lift device 9 may be a flaperon and the features, technical effects and/or advantages that will be described in connection with the high-lift device 9 also apply to a flaperon at least in an analogous manner, so that no corresponding repetition is made. In other embodiments of the invention, the high-lift device 9 may be an aileron and the features, technical effects and/or advantages that will be described in connection with the high-lift device 9 also apply to an aileron at least in an analogous manner, so that no corresponding repetition is made.

The connecting assembly 11 movably connects the high-lift device 9 to the fixed wing portion 7, such that the high-lift device 9 is movable between a retracted position shown in FIG. 3 and at least one extended position of which one is shown for the first embodiment in FIG. 4, for the second embodiment in FIGS. 5 and 6, and for the third embodiment in FIG. 7.

As shown in FIGS. 3, 4, and 5, the connecting assembly 11 comprises a first connecting element 13 and a second connecting element 15. The connecting assemblies 11 of the embodiments of the wing assembly 5 shown in FIGS. 6 and 7 also comprise the first connecting element 13 and the second connecting element 15, however, these elements are not shown in FIGS. 6 and 7 to show the portion of the wing assembly 5 behind these elements. Therefore, the features, technical effects and/or advantages that will be described in connection with the first connecting element 13 and the second connecting element 15 with respect to FIGS. 3, 4, and 5 also apply to the embodiments shown in FIGS. 6 and 7 at least in an analogous manner, so that no corresponding repetition is made. The first connecting element 13 is a lever and is adapted to withstand compressive and tensile loads as well as bending loads. The first connecting element 13 comprises a first end portion 17 and a second end portion 19. The first connecting element 13 extends from the first end portion 17 to the second end portion 19. The first connecting element 13 is rotatably connected to the fixed wing portion 7 at the first end portion 17. The second connecting element 15 is adapted to withstand compressive and tensile loads as well as bending loads. The second connecting element 15 comprises a first end portion 21, and intermediate portion 23, and a second end portion 25. The second connecting element 15 extends from the first end portion 21 via the intermediate portion 23 to the second end portion 25. The intermediate portion 23 is arranged between the first end portion 21 and the second end portion 25. The second connecting element 15 is rotatably connected to the second end portion 19 of the first connecting element 13 at the first end portion 21.

The high-lift device 9 comprises a first portion 27 and a second portion 29. The first portion 27 of the high-lift device 9 is connected to the intermediate portion 23 of the second connecting element 15 and a second portion 29 of the high-lift device 9 is connected to the second end portion 25 of the second connecting element 15. The high-lift device 9 may be non-rotatably connected to the second connecting element 15.

As shown in FIGS. 3, 4, and 5, the wing assembly 5 comprises a drive unit 31, which is configured to drive rotation of the first connecting element 13 relative to the fixed wing portion 7, such that the first connecting element 13 can be driven to perform a pivoting movement about a pivot axis 33. The first connecting element 13 can be driven to pivot around the pivot axis 33 from a first position shown in FIG. 3 to at least one second position of which a respective second position is shown in FIGS. 4 and 5 and from the at least one second position to the first position. As already described, the high-lift device 9 may be non-rotatably connected to the second connecting element 15. The high-lift device 9 may be non-rotatably connected to the second connecting element 15 such that the high-lift device 9 cannot perform a pivoting movement about an axis parallel to the pivot axis 33. However, in this embodiment, the high-lift device 9 may perform a pivoting movement about a pivot axis which extends through a first connection point at which the first portion 27 of the high-lift device 9 is connected to the intermediate portion 23 of the second connecting element 15 and through a second connection point at which the second portion 29 of the high-lift device 9 is connected to the second end portion 25 of the second connecting element 15. In this way, other components of the wing can transfer loads in the wing span direction, may extend parallel to the pivot axis 33, and the wing assembly 5 can be designed to only transfer loads perpendicular to the wing span direction. Therefore, a light-weight design of the wing assembly 5 can be provided.

The drive unit 31 comprises a rotary drive unit. However, in other embodiments of the invention, the drive unit 31 may comprise a linear drive unit the features, technical effects and/or advantages described in connection with the drive unit 31 apply to both, the rotary drive unit and the linear drive unit, at least in an analogous manner, so that no corresponding repetition is made. The wing assembly 5 shown in FIGS. 6 and 7 also comprise the drive unit 31, however, the drive unit 31 is not shown in FIGS. 6 and 7. The features, technical effects and/or advantages described in connection with the drive unit 31 with respect to FIGS. 3, 4, and 5 also apply to the embodiments shown in FIGS. 6 and 7 at least in an analogous manner, so that no corresponding repetition is made.

The wing assembly 5 comprises a subassembly 35 of which one example is shown in FIGS. 5 and 6 and another example is shown in FIG. 7. The wing assembly 5 of the embodiment shown in FIGS. 3 and 4 also comprises a subassembly 35 which is, however, shown in FIGS. 3 and 4. The features, technical effects and/or advantages that will be described in connection with the subassembly 35 with respect to FIGS. 5, 6, and 7 also apply to the embodiments shown in FIGS. 3 and 4 at least in an analogous manner, so that no corresponding repetition is made. The subassembly 35 is attached to the fixed wing portion 7 and to the second connecting element 15 at a connection point 37 shown in FIGS. 6 and 7. The subassembly 35 guides the second connecting element 15 such that for each position of the first connecting element 13 a position of the second connecting element 15 is predefined. In particular, the configuration of the subassembly 35 defines the trajectory of the connection point 37 and, thereby, the trajectory of the high-lift device 9. Further, the position of the first connecting element 13 defines the position of the connection point 37 on the corresponding trajectory and, thereby, particularly depending on the specific configuration of the second connecting element 15, the angle between the high-lift device 9 and the fixed wing portion 7. This angle is also known as a flap angle in case the high-lift device 9 is a flap.

The first example of the subassembly 35 is shown in FIG. 6. The subassembly 35 comprises a first subassembly element 39, a second subassembly element 41, and a third subassembly element 43. The first subassembly element 39 extends from a first end portion 45, at which the first subassembly element 39 is rotatably connected to the fixed wing portion 7, to a second end portion 47. The second subassembly element 41 extends from a first end portion 49, at which the second subassembly element 41 is rotatably connected to the second end portion 47 of the first subassembly element 39, to a second end portion 51, at which the second subassembly element 41 is rotatably connected to a portion of the second connecting element 15 at the connection point 37. The third subassembly element 43 extends from a first end portion 53, at which the third subassembly element 43 is rotatably connected to the fixed wing portion 7, to a second end portion 55, at which the third subassembly element 43 is rotatably connected to an intermediate portion 57 of the second subassembly element 41. The intermediate portion 57 of the second subassembly element 41 is arranged between the first end portion 49 and the second end portion 51 of the second subassembly element 41. This example of the subassembly 35 is known from FIGS. 1, 2, and 3 of DE 101 33 920 B4.

The second example of the subassembly 35 is shown in FIG. 7. The subassembly 35 comprises a first subassembly element 59 and a second subassembly element 61. The first subassembly element 59 extends from a first end portion 63, at which the first subassembly element 59 is slidably connected to the fixed wing portion 7, to a second end portion 65, at which the first subassembly element 59 is rotatably connected to a portion of the second connecting element 15 at the connection point 37. The second subassembly element 61 extends from a first end portion 67, at which the second subassembly element 61 is rotatably connected to the fixed wing portion 7, to a second end portion 69, at which the second subassembly element 61 is rotatably connected to an intermediate portion 71 of the first subassembly element 59, wherein the intermediate portion 71 of the first subassembly element 59 is arranged between the first end portion 63 and the second end portion 65 of the first subassembly element 59. This example of the subassembly 35 is known from FIGS. 6, 7, and 8 of DE 101 33 920 B4.

A main difference between the wing assembly disclosed in DE 101 33 920 B4 and the wing assembly 5 of the invention is the configuration of the first connecting element 13, the second connecting element 15 and the high-lift device 9 and how these components are connected to each other. The first end portion 17 of the first connecting element 13 is rotatably connected to the fixed wing portion 7, the first end portion 21 of the second connecting element 15 is rotatably connected to the second end portion 19 of the first connecting element 13, the first portion 27 of the high-lift device 9 is connected to the intermediate portion 23 of the second connecting element 15 and the second portion 29 of the high-lift device 9 is connected to the second end portion 25 of the second connecting element 15. Due to this configuration, the wing assembly 5 does not need to comprise a guiding lever 40 as shown in FIG. 1 of DE 101 33 920 B4 and the trajectory of the high-lift device 9 can still be well defined. In case the wing assembly 5 does not comprise the guiding lever 40, the length of the path the high-lift device 9 can move between the retracted position and the at least one extended position can be increased. For example, due to this configuration, the maximum high-lift device-angle or flap-angle can be increased from about 30 to 37° to about 40 to/or 45°. This is particularly the case, since the configuration of the present invention does not comprise the guiding lever 40 of DE 101 33 920 B4, and, therefore, the high-lift device 9 of the present invention never assumes a metastable position in which the high-lift device 9 does not move back from an extended position to the retracted position. Another example is that due to this configuration, the high-lift device 9 can be positioned further into a component of the wing to minimize drag, such as in the retracted position of the high-lift device 9.

Since the first portion 27 of the high-lift device 9 is connected to the intermediate portion 23 of the second connecting element 15 and a second portion 29 of the high-lift device 9 is connected to the second end portion 25 of the second connecting element 15, loads can be transferred distributed over two separate portions between the high-lift device 9 and the second connecting element 15, which may reduce the bending loads acting on the individual components and may result in a weight reduction of the wing assembly. In case the high-lift device 9 is non-rotatably connected to the second connecting element 15, the wing assembly 5 provides a mechanically robust assembly for movably connecting the high-lift device 9 to the fixed wing portion 7, such that the high-lift device 9 is movable between a retracted position and at least one extended position. Further, the subassembly 35 provides mechanical support for the movement of the high-lift device 9 and ensures that the trajectory of the high-lift device 9 is well defined. As described above, multiple designs of subassemblies 35 can be applied in the wing assembly 5.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A wing assembly, comprising:
   a fixed wing portion,
   a high-lift device, and
   a connecting assembly movably connecting the high-lift device to the fixed wing portion, such that the high-lift device is movable between a retracted position and at least one extended position,
   wherein the connecting assembly comprises
     a first connecting element having a first end portion rotatably connected to the fixed wing portion, and having a second end portion, and
     a second connecting element, which extends from a first end portion, at which the second connecting element is rotatably connected to the second end portion of the first connecting element, to a second end portion,
   wherein the second connecting element comprises an intermediate portion, which is arranged between the first end portion of the second connecting element and the second end portion of the second connecting element, wherein a first portion of the high-lift device is connected to the intermediate portion of the second connecting element and a second portion of the high-lift device is connected to the second end portion of the second connecting element, wherein a subassembly comprises
a first subassembly element having
a first end portion pivotally connected to the fixed wing portion, and a second end portion,
a second subassembly element having
a first end portion pivotally attached to the high-lift device, a second end portion, and an intermediate portion,
wherein the second end portion of the first subassembly element is pivotally attached to the intermediate portion of the second subassembly element and slidably attached to the fixed wing portion.

2. The wing assembly according to claim 1, wherein the wing assembly comprises a drive unit, which is configured to drive rotation of the first connecting element relative to the fixed wing portion.

3. The wing assembly according to claim 2, wherein the drive unit comprises a rotary drive unit.

4. The wing assembly according to claim 3, wherein the drive unit comprises a linear drive unit.

5. The wing assembly according to claim 1, wherein the high-lift device is a flap.

6. A wing comprising the wing assembly according to claim 1.

7. An aircraft comprising the wing according to claim 6.

8. The wing assembly according to claim 1, further comprising a third subassembly element having a first end portion pivotally attached to the fixed wing portion, and a second end portion pivotally attached to the second end portion of the second subassembly element.

9. A wing assembly, comprising:
a fixed wing portion,
a high-lift device, and
a connecting assembly movably connecting the high-lift device to the fixed wing portion, such that the high-lift device is movable between a retracted position and at least one extended position,
wherein the connecting assembly comprises
a first connecting element having a first end portion rotatably connected to the fixed wing portion, and having a second end portion, and
a second connecting element, which extends from a first end portion, at which the second connecting element is rotatably connected to the second end portion of the first connecting element, to a second end portion,
wherein the second connecting element comprises an intermediate portion, which is arranged between the first end portion of the second connecting element and the second end portion of the second connecting element,
wherein a first portion of the high-lift device is connected to the intermediate portion of the second connecting element and a second portion of the high-lift device is connected to the second end portion of the second connecting element,
a subassembly comprising:
a first subassembly element having a first end portion attached to the fixed wing, a second end portion attached to the high-lift device, and an intermediate portion,
a second subassembly element having a first end portion pivotally attached to the fixed wing portion, and a second end portion pivotally attached to the intermediate portion of the first subassembly element and slidably connected to the fixed wing portion.

* * * * *